United States Patent
Cherukuri et al.

(10) Patent No.: US 7,219,220 B2
(45) Date of Patent: May 15, 2007

(54) METHODS AND APPARATUSES FOR RESETTING THE PHYSICAL LAYERS OF TWO AGENTS INTERCONNECTED THROUGH A LINK-BASED INTERCONNECTION

(75) Inventors: Naveen Cherukuri, San Jose, CA (US); Sanjay Dabral, Palo Alto, CA (US); David S. Dunning, Portland, OR (US); Tim Frodsham, Portland, OR (US); Theodore Z. Schoenborn, Portland, OR (US)

(73) Assignee: Intel Corporation, Santa Clara, CA (US)

(*) Notice: Subject to any disclaimer, the term of this patent is extended or adjusted under 35 U.S.C. 154(b) by 492 days.

(21) Appl. No.: 10/850,783

(22) Filed: May 21, 2004

(65) Prior Publication Data
US 2005/0262336 A1  Nov. 24, 2005

(51) Int. Cl.
  *G06F 15/177*  (2006.01)
  *G06F 9/00*  (2006.01)

(52) U.S. Cl. .............................. 713/2; 713/1

(58) Field of Classification Search ............ None
See application file for complete search history.

(56) References Cited

U.S. PATENT DOCUMENTS

| 2003/0107989 A1* | 6/2003 | Ray ..................... 370/229 |
| 2005/0025226 A1* | 2/2005 | Mizuguchi et al. ......... 375/220 |
| 2005/0188232 A1* | 8/2005 | Weng et al. ............... 713/320 |

* cited by examiner

*Primary Examiner*—Rehana Perveen
*Assistant Examiner*—Stefan Stoynov
(74) *Attorney, Agent, or Firm*—Blakely, Sokoloff, Taylor & Zafman LLP

(57) ABSTRACT

A method for effecting an in-band reset of the physical layers of two agents interconnected through a link-based interconnection scheme. In accordance with one embodiment of the invention, a first of the two agents ceases its forwarded clock to initiate the in-band reset. Upon realization of the cessation, a second agent ceases its forwarded clock and proceeds to a reset state. The first agent then proceeds to a reset state. Subsequently, after waiting a specified period of time, both agents proceed with a re-initialization of the physical layer. In accordance with one embodiment of the invention, the re-initialization of the physical layer is effected without impacting other layers of the interconnection hierarchy.

24 Claims, 2 Drawing Sheets

METHODS AND APPARATUSES FOR RESETTING THE PHYSICAL LAYERS OF TWO AGENTS INTERCONNECTED THROUGH A LINK-BASED INTERCONNECTION

FIELD

Embodiments of the invention relate generally to the field of processing systems employing a link-based interconnection scheme, and more specifically to methods for resetting the physical layer of two interconnected agents.

BACKGROUND

To address the disadvantages of bus-based interconnection schemes for multiple-processor systems (MPSs), point-to-point, link-based interconnection schemes have been developed. Each node of such a system includes an agent (e.g., processor, memory controller, I/O hub component, chipsets, etc.) and a router for communicating data between connected nodes. The agents of such systems communicate data through use of an interconnection hierarchy that typically includes a protocol layer, an optional routing layer, a link layer, and a physical layer.

The protocol layer, which is the highest layer of the interconnection hierarchy, institutes the interconnection protocol, which is a set of rules that determines how agents will communicate with one another. For example, the interconnection protocol sets the format for the protocol transaction packet (PTP), which constitutes the unit of data that is communicated between nodes. Such packets typically contain information to identify the packet and indicate its purpose (e.g., whether it is communicating data in response to a request or requesting data from another node).

The routing layer determines a path over which data is communicated between nodes. That is, because each node is not connected to every other node, there are multiple paths over which data may be communicated between two particular nodes. The function of the routing layer is to specify the optimal path.

The link layer receives the PTPs from the protocol layer and communicates them in a sequence of flits. The link layer handles the flow control, which may include error checking and encoding mechanisms. Through the link layer, each node is keeping track of data sent and received and sending and receiving acknowledgements in regard to such data.

The physical layer consists of the actual electronics and signaling mechanisms at each node. In point-to-point, link-based interconnection schemes, there are only two agents connected to each link. This limited electronic loading results in increased operating speeds.

The interconnection hierarchy is implemented to achieve greater system operating speed at the physical layer. The link layer is transmitting data (received as PTPs from the protocol layer) in flits, which are then decomposed into phits at the physical layer and are communicated over the PLI to the physical layer of a receiving agent. The received phits are integrated into flits at the physical layer of the receiving agent and forwarded to the link layer of the receiving agent, which combines the flits into PTPs and forwards the PTPs to the protocol layer of the receiving agent.

The electronics of the physical layer typically include some training logic that allows the physical layer of each node of a link to operate using the link. That is, the training logic allows the physical layers to calibrate their internal integrated circuit devices so that they are compatible with the link (i.e., the physical interconnect). This process is known as physical layer link initialization.

After initialization, or in some instances during the initialization, it may become necessary to reset the physical layers on two interconnected agents. In typical systems, agents have a fixed hierarchy and an agent at the higher level resets an agent at a lower level using a specific set of signals. Such a physical layer reset scheme impacts higher layers of the link.

BRIEF DESCRIPTION OF THE DRAWINGS

The invention may be best understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Throughout the specification, the terms node and agent are used generally interchangeably, while it is to be understood that a particular agent may have one or more ports associated therewith.

Physical Layer Initialization

A portion of the PLI logic is used to effect link training or calibration. The training logic allows the physical layer on each side of the link to be calibrated in order to begin using the link. That is, the internal semiconductor devices are calibrated to be compatible with the I/O link of the PLI. The initial calibration procedure is referred to as initialization of the physical layer. This initialization is effected in a sequence of stages with the initialization of each subsequent stage requiring the training of I/O circuitry in a previous stage.

Figure 1:
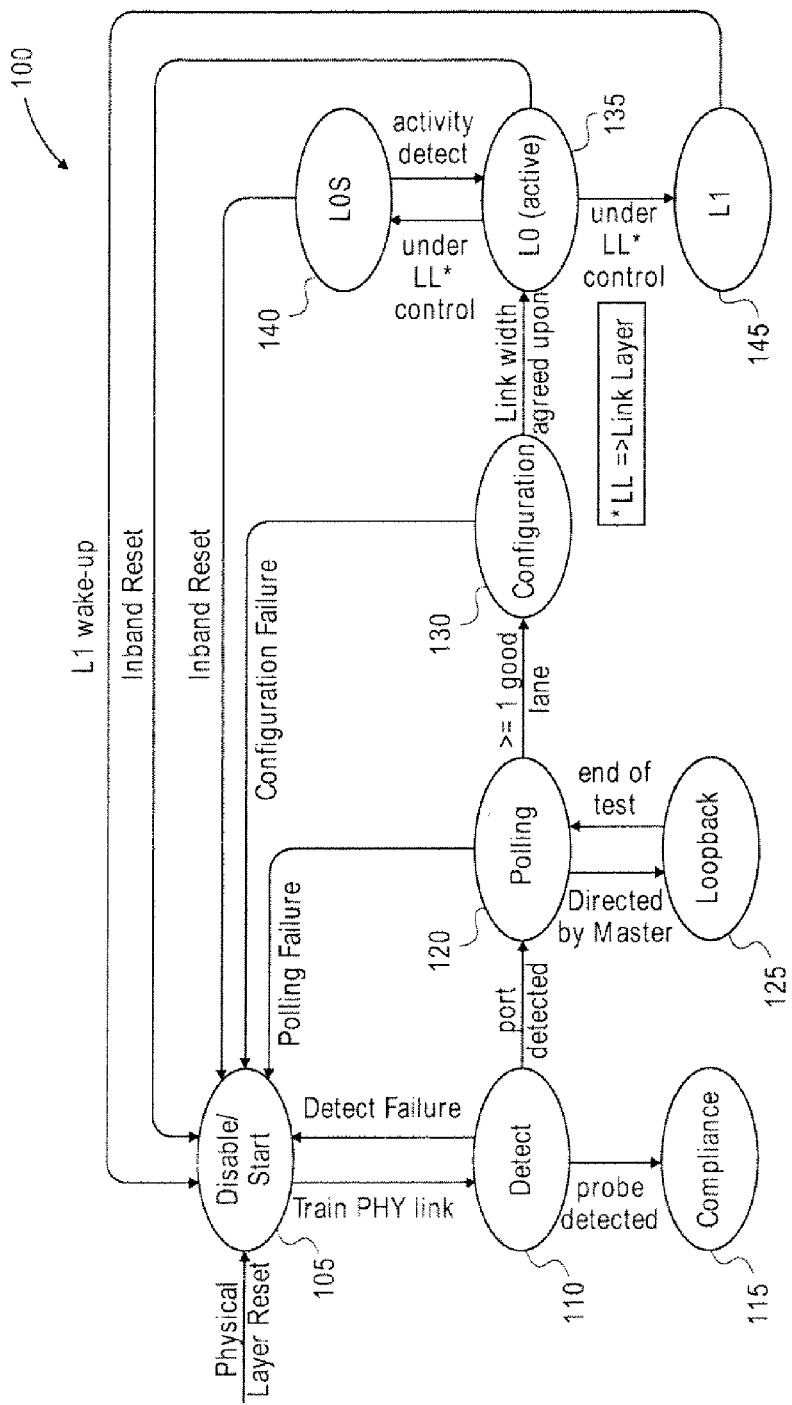
FIG. 1 illustrates a state machine for effecting a physical layer initialization of a link in which the physical layer is reset using in-band reset in accordance with one embodiment of the invention.

FIG. 1 illustrates a state machine for effecting a physical layer initialization of a link in which the physical layer is reset using in-band reset in accordance with one embodiment of the invention. State machine 100, shown in FIG. 1, represents an initialization sequence starting with Disable/

Start operation 105. The Disable/Start state 105 is entered at power-on or in response to any physical layer reset event. Upon starting, the PLI performs a Detect operation 110 to detect an interconnected agent. The Detect operation 110 is the point at which two agents are synchronized to commence link initialization. The Detect operation 110 determines if there is another physical layer agent (i.e., the physical layer of another agent) at the other end of the link. Alternative embodiments of the invention provide a PLI that can distinguish between detection of an interconnected agent and a test probe.

In Detect operation 110, the local port activates a forwarded clock and begins locking to the received clock from the remote port. If at the end of some specified time, the received clock is not detected, the local port abandons the initialization sequence and resets to operation Disable/Start 105. The Detect operation 110 then checks for a known DC pattern of the remote agent.

Upon detecting each other, the interconnected agents begin a Polling operation 120 to effect interactive training. During Polling operation 120, the link is trained to operate with the high-speed clock used to select between the two interconnected agents.

Upon completion of the Polling operation 120, a Configuration operation 130 is performed. During Configuration operation 130, information acquired during polling is used to configure the link. At this point, link initialization is complete and the link layer takes control of the port at state L0 135, unless the local and remote ports cannot agree on a link configuration, in which case, the initialization sequence is abandoned and reset to operation Disable/Start 105.

The physical layer electronics are still active, but engaged in decomposing the flits on one side of the link and reconstructing them on the other side of the link. The physical layer is no longer involved in training and operates under the direction of the link layer in state L0 to transfer data across the link.

Low-Power Modes

For one embodiment of the invention, the physical layer may enter a low-powered mode. As shown in FIG. 1, state machine 100 also includes two low power states L0S 140 and L1 145. The low power modes are used to save power when the system will be dormant for some time. Each low-power mode has a pre-determined reactivation time (wake-up time). L0S 140 has a relatively short wake-up time (e.g., 20 ns) for relatively short dormancy periods. Therefore in L0S 140, less of the circuitry is turned off. L1 145 has a relatively longer wake-up time (e.g., 10 μs) for relatively longer dormancy periods. The low power mode used is dependent upon the expected dormancy pattern of the system.

In-Band Reset

As discussed above in reference to FIG. 1, a forwarded clock is sent, during the Detect operation 110 by the local agent, which then awaits a received clock from the remote port. A forwarded clock is an explicit clock signal transmitted along with the outgoing data on the physical interconnect using dedicated clock pins. The forwarded clock is sent during the Detect operation 110 and continues indefinitely. Using a forwarded clock, the local and remote agents each indicate to each other the clock signal they have received from the system clock. The forwarded clock allows each agent to know what clock signal they should use to receive data from the other. In accordance with one embodiment of the invention, an in-band reset is initiated by cessation of the forwarded clock. An in-band reset is used by the link layer to re-initialize the physical layer if the physical layer cannot recover from CRC errors beyond a specified retry threshold. In-band reset is also used to configure the physical layer by overriding power-on default values through soft reset. Additionally, the in-band reset can be used in response to a failure during the initialization of the physical layer to force the two interconnected agents to re-initialize the link.

Figure 2:
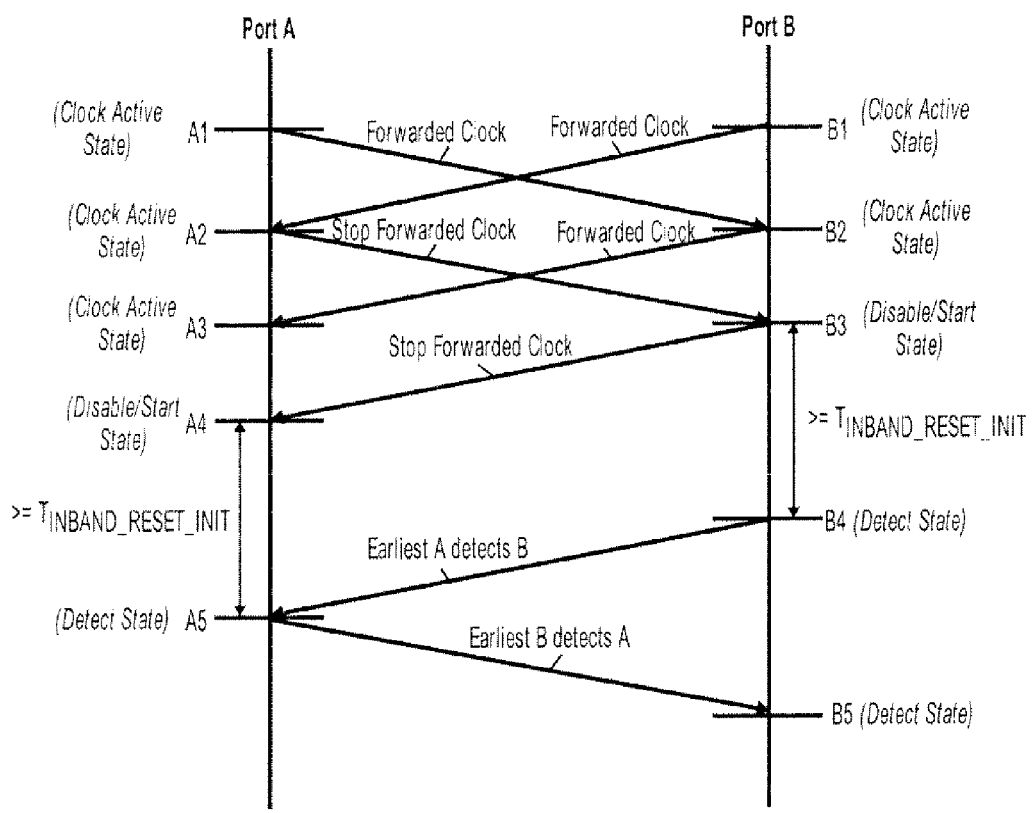
FIG. 2 illustrates an in-band reset process in accordance with one embodiment of the invention.

FIG. 2 illustrates an in-band reset process in accordance with one embodiment of the invention. Port A and Port B, shown in FIG. 2, represent the physical layers of two interconnected agents. For one embodiment of the invention, Port A and Port B are the 20-bit ports of the physical layers of two agents interconnected using a point-to-point, link-based interconnection scheme. At point A1 of the in-band reset process, Port A is in a clock active state. Port A could be in an active mode, a low power mode (e.g., L0S 140), or at some point in the physical layer initialization process described above in reference to FIG. 1 (i.e., a state other than Disable/Start 105 or the agent detection stage of the Detect operation 110). At point A1, Port A is transmitting a forwarded clock to Port B, and/or the received clock from Port B is being received. At point B1, Port B is in a state other than Disable/Start 105 or the agent detection stage of the Detect operation 110 and is transmitting a forwarded clock to Port A, and/or the received clock from Port A is being received. That is, at points A1 and B1, Port A and Port B are operating normally, the link is active or in the process of initializing.

At point A2, Port A indicates the initiation of an in-band reset to reinitialize the physical layer portion of the link. Port A may commence a re-initialization for any of the variety of reasons discussed above. Port A effects the indication of an in-band reset initiation by ceasing transmission of the forwarded clock to Port B. Port A also ceases driving data lanes at point A2, but continues to receive the received clock and accept incoming data from Port B. At point B2, Port B is still in a clock active state while the in-band reset is "in flight." Port B is unaware of the cessation of the forwarded clock from Port A and therefore, Port B continues to transmit its forwarded clock and data to Port A.

At point A3, Port A continues in active state because Port A continues to receive the received clock form Port B. Even though Port A has initiated an in-band reset by ceasing its forwarded clock, Port A does not enter the Disable/Start state 105 at this time, because Port A has not received acknowledgement (handshake) of the in-band reset initiation from Port B.

At point B3, Port B loses received clock and interprets this as an in-band reset. That is, by ceasing its forwarded clock, Port A has rendered Port B unable to operate in its normal mode, as Port B can no longer receive any information from Port A. Port B is forced to start a physical layer reset process. A physical layer reset process is defined such that at the beginning of the process, the clocks are not active. So to reset the physical layer, Port B begins by ceasing transmission of its forwarded clock and data lanes to Port A. Port B then enters Disable/Start state 105. Port B does not proceed to Detect operation 110 immediately because Port A is still active and if Port B proceeded to the Detect operation 110, Port B would detect Port A and then proceed to Polling operation 120. Subsequently, Port A would notice the cessation of the forwarded clock from Port B and would proceed to the Disable/Start state 105 since Port A initiated the in-band reset. Therefore at point B3, Port B, after ceasing transmission of its forwarded clock to Port A, proceeds to the Disable/Start state 105 and waits.

At point A4, Port A realizes the loss of the received clock from Port B which is considered an acknowledgement from Port B of the in-band reset initialization commenced by Port A. With this handshake, Port A proceeds to the Disable/Start state 105.

At point B4, Port B proceeds to the Detect operation 110 after waiting for at least a specified minimum time period from the time of realization that its received clock was lost (point B3). Port B stays in the Disable/Start state 105 at least long enough for Port A to proceed to the Disable/Start state 105. Otherwise, Port B may proceed to Detect operation 110 and detect Port A while Port A is proceeding to the Disable/Start state 105. For one embodiment of the invention, Port B waits a specified time in the Disable/Start state 105 before proceeding to the Detect operation 110. For one such embodiment, the specified time is at least 8,192 clock cycles. For one embodiment of the invention in which internal calibration is forced, Port B waits a specified time after completing internal calibration.

At point A5, Port A proceeds to the Detect operation 110 after waiting for at least a specified minimum time period from the time of realization that its received clock was lost (point A4). For one embodiment of the invention, Port A waits a specified time in the Disable/Start state 105 before proceeding to the Detect operation 110. For one such embodiment, the specified time is at least 8,192 clock cycles. Point A5 is the earliest point at which Port A can detect Port B. Subsequently, at point B5, Port B can detect Port A.

General Matters

Embodiments of the invention provide methods and apparatuses for effecting an in-band reset of the physical layers of two agents interconnected through a link-based interconnection scheme. One embodiment of the invention allows initiation of an in-band reset from a local port through the cessation of a forwarded clock signal.

Embodiments of the invention include a state machine with various states and methods for effecting an in-band reset having various operations. These are described in their most basic form, but states or operations can be added to or deleted from any of the state machines or methods, respectively, without departing from the basic scope of the invention.

For example, for an alternative embodiment of the invention, the port initiating the in-band reset (Port A) need not wait in the Disable/Start state 105, but may proceed directly to the Detect operation 110. An embodiment, as described above in reference to FIG. 2, in which Port A waits a specified time before proceeding from the Disable/Start state 105 to the Detect operation 110 addresses the situation where Port A does not initiate an in-band reset, but only appears to have done so from the perspective of Port B. For example, the trace carrying the clock from Port A to Port B may become disabled, causing Port B to perceive that Port A has initiated an in-band reset by ceasing its forwarded clock. Now, when Port B ceases its forwarded clock in supposed acknowledgement to Port A, Port A perceives the cessation of Port B's forwarded clock as an initiation of an in-band reset by Port B. If either port proceeded immediately to the Detect operation 110 under these circumstances, deadlock would result.

Soft Reset

A soft reset is a mechanism that may be used by firmware, test tools, and the link layer to reset the physical layer after configuring link parameters at both ports. In accordance with one embodiment of the invention a soft reset may be effected using an in-band reset (IBR) as described above. For such an embodiment a local port communicates the reset event to the remote port using an IBR. Both ports proceed with link re-initialization using updated link parameters. For one embodiment of the invention, the updated parameters include an updated forwarded clock frequency.

The states and operations of the invention may be effected by hardware components or may be embodied in machine-executable instructions as described above. Alternatively, they may be performed by a combination of hardware and software. The invention may be provided as a computer program product that may include a machine-accessible medium having stored thereon instructions, which may be used to program a computer (or other electronic devices) to perform a process according to the invention as described above.

A machine-accessible medium includes machine-accessible storage medium and transmission medium that provide information in a form accessible by a machine (e.g., a computer, network device, personal digital assistant, manufacturing tool, any device with a set of one or more processors, etc.). For example, a machine-accessible storage medium includes recordable/nonrecordable media (e.g., read only memory (ROM); random access memory (RAM); magnetic disk storage media; optical storage media; flash memory devices; etc.). Examples of transmission medium are electrical, optical, acoustical or other form of propagated signals (e.g., carrier waves, infrared signals, digital signals, etc.).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising;
   ceasing a forwarded clock transmission from a physical layer of a first agent to a physical layer of a second agent, the first agent and the second agent interconnected through a link-based interconnection scheme;
   in response to the cessation of the forwarded clock transmission from the physical layer of the first agent, ceasing a forwarded clock transmission and data lane transmission from the second agent to the first agent and advancing the second agent to a reset state;
   in response to the cessation of the forwarded clock transmission and data lane transmission from the physical layer of the second agent, advancing the first agent to a reset state;
   advancing the second agent to a physical layer re-initialization state after a specified time; and
   advancing the first agent to the physical layer re-initialization state.

2. The method of claim 1 wherein a re-initialization of the physical layer is effected without a re-initialization of a link layer.

3. The method of claim 1 wherein the forwarded clock ceases due to an initiation of a physical layer reset by the first agent.

4. The method of claim 1 wherein the first agent is advanced to the physical layer re-initialization state after a second specified time.

5. The method of claim 4 wherein the specified time and the second specified time are equal.

6. The method of claim 4 wherein the forwarded clock ceases due to a failure of a clock lane over which the forwarded clock is transmitted.

7. The method of claim 1 wherein the two agents are components selected from the group consisting of a processor, a memory controller, an input/output hub component, a chipset, and combinations thereof.

8. A system comprising:
   a plurality of agents interconnected through a point-to-point link-based interconnection scheme wherein a first agent initiates an in-band reset of a physical layer link by ceasing a forwarded clock signal, wherein the cessation of the forwarded clock causes a second agent, interconnected with the first agent, to cease a forwarded clock transmission and data lane transmission from the second agent to the first agent and to advance to a reset state, and causes the first agent to advance to a reset state.

9. The system of claim 8 wherein a re-initialization of the physical layer is effected without a re-initialization of a link layer.

10. An apparatus comprising:
    a physical layer port of a first agent interconnected to a second agent through a link-based interconnection;
    means for transmitting a forwarded clock signal from the physical layer port of the first agent to a physical layer port of the second agent;
    means for ceasing the transmission of the forwarded clock signal, such that a re-initialization of the physical layer of the second agent is initiated;
    means for detecting that a forwarded clock signal from the second agent has ceased; and
    means for advancing to a reset state upon detecting that the forwarded clock signal from the second agent has ceased.

11. The apparatus of claim 10 wherein the first agent and the second agent are components selected from the group consisting of a processor, a memory controller, an input/output hub component, a chipset, and combinations thereof.

12. An article of manufacture comprising:
    a machine-accessible storage medium having associated data, wherein the data, when accessed, results in a machine performing operations comprising:
    ceasing a forwarded clock transmission from a physical layer of a first agent to a physical layer of a second agent, the first agent and the second agent interconnected through a link-based interconnection scheme;
    ceasing a forwarded clock transmission and data lane transmission from the second agent to the first agent and advancing the second agent to a reset state;
    advancing the first agent to a reset state;
    advancing the second agent to a physical layer re-initialization state; and
    advancing the first agent to the physical layer re-initialization state.

13. The article of manufacture of claim 12 wherein ceasing a forwarded clock transmission and data lane transmission from the second agent to the first agent is in response to the cessation of the forwarded clock transmission from the physical layer of the first agent.

14. The article of manufacture of claim 13 wherein advancing the first agent to a reset state is in response to the cessation of the forwarded clock transmission and data lane transmission from the physical layer of the second agent.

15. The article of manufacture of claim 14 wherein the second agent is advanced to a physical layer re-initialization state upon the expiration of a specified time.

16. The article of manufacture of claim 12 wherein the forwarded clock ceases due to an initiation of a physical layer reset by the first agent.

17. The article of manufacture of claim 15 wherein the first agent is advanced to the physical layer re-initialization state after a second specified time.

18. The article of manufacture of claim 17 wherein the specified time and the second specified time are equal.

19. The article of manufacture of claim 12 wherein the forwarded clock ceases due to a failure of a clock lane over which the forwarded clock is transmitted.

20. The article of manufacture of claim 12 wherein the two agents are components selected from the group consisting of a processor, a memory controller, an input/output hub component, a chipset, and combinations thereof.

21. A method comprising:
    updating a set of link parameters at each of two ports, each of the two ports associated with a corresponding agent, the corresponding agents interconnected through a link-based interconnection scheme;
    ceasing a forwarded clock transmission from a physical layer of a first of the two agents to a physical layer of a second of the two agents;
    in response to the cessation of the forwarded clock transmission from the physical layer of the first agent, ceasing a forwarded clock transmission and data lane transmission from the second agent to the first agent and advancing the second agent to a reset state;
    in response to the cessation of the forwarded clock transmission and data lane transmission from the physical layer of the second agent, advancing the first agent to a reset state;
    advancing the second agent to a physical layer re-initialization state after a specified time;
    advancing the first agent to the physical layer re-initialization state; and
    re-initializing the physical layer of each of the two ports using the updated set of link parameters.

22. The method of claim 21 wherein a re-initialization of the physical layer is effected without a re-initialization of a link layer.

23. The method of claim 21 wherein the set of link parameters includes a forwarded clock frequency.

24. The method of claim 23 wherein the two agents are components selected from the group consisting of a processor, a memory controller, an input/output hub component, a chipset, and combinations thereof.

* * * * *